United States Patent [19]
Kay

[11] Patent Number: 5,729,598
[45] Date of Patent: Mar. 17, 1998

[54] TELEPHONE NETWORK WITH TELECOMMUTING FEATURES

[75] Inventor: William A. Kay, Glendora, N.J.

[73] Assignee: Bell Atlantic Network Services, Inc., Arlington, Va.

[21] Appl. No.: 613,560

[22] Filed: Mar. 11, 1996

[51] Int. Cl.[6] .................................................. H04M 15/00
[52] U.S. Cl. ...................... 379/115; 379/114; 379/112; 379/207
[58] Field of Search ....................... 379/112, 114, 379/115, 121, 127, 207, 229, 230

[56] References Cited

U.S. PATENT DOCUMENTS

| | | |
|---|---|---|
| 4,054,756 | 10/1977 | Cornelia et al. .................. 379/207 |
| 4,611,096 | 9/1986 | Asmuth et al. . |
| 5,206,899 | 4/1993 | Gupta et al. . |
| 5,222,125 | 6/1993 | Creswell et al. . |
| 5,247,571 | 9/1993 | Kay et al. . |
| 5,384,831 | 1/1995 | Creswell et al. . |
| 5,422,941 | 6/1995 | Hasenauer et al. .................. 379/207 |
| 5,539,807 | 7/1996 | Ghisler et al. ..................... 379/58 |
| 5,550,907 | 8/1996 | Carlsen ............................. 379/207 |
| 5,579,379 | 11/1996 | D'Amico et al. ................... 379/112 |

Primary Examiner—Curtis Kuntz
Assistant Examiner—Rexford N. Barnie
Attorney, Agent, or Firm—Lowe, Price, LeBlanc & Becker

[57] ABSTRACT

A public switched telephone network having an advanced intelligent network and intelligent peripheral is utilized to provide a work-at-home office for one or more employees of one or more companies wherein those work-at-home employees are enabled to place business calls from their residence telephones with automatic billing of such calls to the employer. One residence directory number may be utilized by multiple work-at-home employees who may be employed by multiple employers. The work-at-home employees utilize personal identification numbers in conjunction with residence directory number identification in such a manner that the placement of the call and entry of the PIN identify the employer billing directory number to be charged. System administration is arranged so that the service may be activated or deactivated by a system administrator connecting with the intelligent peripheral from an authorized directory number and providing an activating-deactivating signal.

19 Claims, 8 Drawing Sheets

TELEPHONE NETWORK WITH TELECOMMUTING FEATURES

FIELD OF THE INVENTION

This invention relates to public switched telephone systems, and more particularly, relates to a public switched telephone network adapted to provide convenient establishment and implementation of work-at-home features.

BACKGROUND OF THE INVENTION

Telecommuting or working at home through the use of the public switched telephone network has become commonplace and numerous facilities have evolved for implementing such arrangements to greater and lesser degrees of sophistication. The more common of these arrangements are designed for the worker who telecommutes as a matter of course on a virtually full time basis and who may be associated with a networked or Centrex connected employer. Less attention has been directed to the worker who may be employed by a small business and desires to telecommute on an irregular and less than full time basis. The Federal Clean Air Act of 1990 (PL 101-549) is directed at improving air quality. One means of accomplishing this is through automobile traffic reduction with a concomitant decrease in traffic produced air pollution. An expansion of the use of telecommuting provides a significant contribution toward accomplishment of that goal.

U.S. Pat. No. 5,247,571, issued Sep. 21, 1993, to William A. Kay et al., and assigned to the assignee of the instant application, describes methods and system structures for providing private network service features to business customers with facilities at a number of geographically diverse locations through the public telephone network. That service involves extending Centrex service features to a multiple end office environment and includes provisions for implementing a work-at-home feature in such a Centrex environment. An Area Wide Centrex service is provided in a telephone communication network having a plurality of interconnected central office switching systems, each at a different location. Each of the central office switching systems connects to a number of local telephone lines, a number of which can be designated as members of a business group for a particular customer. Area Wide Centrex extends a number of service features to the business group over a broad area through multiple central offices by taking the programming intelligence capacity out of the central offices and moving it to a central point. Service features such as call routing are controlled by data stored in a central data base. Establishing or changing services for one or all of a particular customer's lines requires only reprogramming that customer's data in the central data base, without the need to reprogram each central office switch. The Centrex system can be arranged to provide a work-at-home feature.

In providing this feature the patent describes a method of extending the Area Wide Centrex service features to one or more lines which are not members of the group. This aspect of the invention provides a "Work-At-Home" type service. The method includes the steps of designating at least one of the local communication lines connected to each of the central office switching systems as members of a business group and storing in the central data base data identifying at least one communication line which is not a member of a business group as associated with one of the members of the business group. The central data base also stores data for providing a Centrex communication service to the business group. The method further comprises the steps of receiving a request for the Centrex communication service in one of the central office switching systems from one of the connected local communication lines and checking the stored identifying data to recognize that the service request originates from the associated non-member line. The system then accesses the central data base to obtain call processing data associated with the business group, and provides the Centrex communication service to the associated non-member line based on the accessed call processing data.

The "Work-At-Home" feature allows billing for the Centrex communication service against the line of the business group associated with the non-member line based on the identifying data stored in the central data base. The central data base can also store data for providing a plurality of Centrex services to the business group wherein the plurality of services include at least extension number dialing, call transfer and call routing control. These services can then be provided both to the members of the group and to the associated non-member line.

U.S. Pat. Nos. 5,222,125 and 5,384,831 issued Jun. 22, 1993 and Jan. 24, 1995 to Carroll W. Creswell et al., for a System for Providing Personalized Telephone Calling Features. These patents describe a public switched telephone network which is adapted to provide a common platform for the provision of customer controlled features. The system includes an adjunct so that a telephone subscriber may place a long distance telephone call to his/her home telephone and have the telephone call automatically billed to a respective service telephone number associated with the adjunct. The adjunct is also capable of offering a menu of services that the subscriber has programmed. The subscriber is allowed to place a call to the "home" telephone station set or another telephone station set. The billing for such a telephone call is charged to the service telephone number rather than to the telephone number identifying the subscriber's "home" telephone. The network includes a service adjunct to process a call associated with one of its subscribers in a manner prescribed by the subscriber.

To initiate the service, a user dials a telephone station number associated with adjunct. A connection is made and the subscriber receives a unique telephone service number. The assigned personalized calling service number travels with the user as the user relocates from one area to another area of the country. The user is assigned a PIN and a security code group of Caller Identification Numbers (CIN). Upon the entry of a certain CIN number, the calling party is not billed for the associated call. Upon the entry of the CIN and the PIN, the subscriber can establish a long distance telephone connection to a desired telephone station and the charges are not made to the home telephone. The subscriber can also program various personalized services in the adjunct, such as call forwarding, caller screen and other features. The subscriber may dynamically specify a number of caller identifiers and a different call treatment for each such identifier as well as a particular billing mode. Thus, the subscriber may associate different billing modes with different call identifiers such that the originator of a call associated with a first type of identifier pays for the call, whereas the subscriber pays for a call associated with a second type of call identifier.

U.S. Pat. No. 5,206,899 issued to Alok K. Gupta et al., Apr. 27, 1993 for an Arrangement for Outbound Telecommunications. That patent describes a system wherein a subscriber can assign desired characteristics to any "target station" which is an active phone accessible to a telecommunications network. A call thereafter that originated from the target station can use customized features such as account code dialing and corporate billing arrangements. The identity of the target station with respect to the communications network is not changed. Initially, a service profile is created and stored for each subscriber and contains information describing desired features and billing options. The characteristics of a particular target station are changed by an activation process that can be initiated from any location. An ANI associated with the target station is entered into the ANI trigger table in an intelligent switch and the service profile is loaded into a data base. When a call is originated in the target station, information in the database is applied to the switch to provide the desired characteristics. An example of one of the features is when an employee of company X wishes to make business related calls from his/her home, the call has the characteristics of a call made from the office by a special billing arrangement.

U.S. Pat. No. 4,611,096 to Richard L. Asmuth et al., for a Telephone Office Service Assist and Handoff on Sep. 9, 1986. The patent describes a system for providing custom incoming telephone call processing services to a corporate customer operating at geographically dispersed locations through a plurality of local office switches. A data base executes a customer program unique to a customer in response to each call to the customer. The customer program determines from call parameters how to process a particular call and instructs the serving office to perform specific primitive call processing to process the call. Incoming calls to the customer are routed at an Action Control Point (ACP) which typically is a modified toll office. The ACP has a number of call processing capabilities. The customer program controls the ACP to string together the desired primitive call processing capabilities to process each call to the customer. The customer call processing can include customized billing for the calls. The charge for the calls can be split between the customer and the caller.

DISCLOSURE OF THE INVENTION

Acronyms

The written description uses a large number of acronyms to refer to various services and system components. Although known, use of several of these acronyms is not strictly standardized in the art. For purposes of this discussion, acronyms therefore will be defined as follows:

Access Code (AC)
Action Control Point (ACP)
Advanced Intelligent Network (AIN)
Automatic Message Accounting (AMA)
Automatic Number Identification (ANI)
Area Wide Centrex (AWC)
Advanced Services Platform (ASP)
Caller Identification Number (CIN)
Central Office (CO)
Common Channel Inter-office Signalling (CCIS)
Data and Reporting System (DRS)
Identification (ID)
Integrated Service Control Point (ISCP)
Intelligent Peripheral (IP)
Interexchange Carrier (IXC)
Maintenance and Operations Center (MOC)
North American Numbering Plan (NANP) Number
Personal Identification Number (PIN)
Plain Old Telephone Service (POTS)
Private Branch Exchange (PBX)
Private Automatic Branch Exchange (PABX)
Public Switched Telephone Network (PSTN)
Public Office Dialing Plan (PODP)
Service Control Point (SCP)
Service Management System (SMS)
Service Switching Point (SSP)
Signaling Transfer Point (STP)
Station Message Detail Recording (SMDR)
Service Creation Environment (SCE)
Telephone Company (TELCO)
Transaction Capabilities Applications Protocol (TCAP)
Work-at-Home (WAH)

DISCLOSURE OF THE INVENTION

Objectives

It is an object of the invention to provide a system and method for utilizing the public switched telephone network to provide work-at-home facilities which are adapted to implementation by both small and large businesses, including from POTS telephones, with a minimum requirement for additional hardware for the TELCO or business.

It is another object of the invention to provide such facilities which make it possible for multiple telecommuters to utilize the same residence as a base for telecommuting for different businesses using either one or multiple telephone lines.

It is yet another object of the invention to provide such a system in a form that imposes minimum administration requirements on subscribing businesses.

SUMMARY OF THE INVENTION

The work-at-home service is preferably provided in a Public Switched Telephone Network (PSTN) having an Advanced Intelligent Network (AIN) and preferably having an Intelligent Peripheral (IP) for performing administration functions as well as call handling capabilities.

In a simpler embodiment, a System Administrator designated by a business by which the telecommuter is employed subscribes to the service and is provided with an 800 number to access the IP. The subscribing business has previously established with the PSTN business office a list of work-at-home employee authorized home directory numbers for their residence phones and matching business or work directory numbers to which authorized WAH calls are to be billed. In accordance with a preferred embodiment of the invention the business subscriber may also establish identification (ID) or Personal Identification Numbers (PINs) for use in instances wherein a residence number may support telecommuting by multiple persons from the same directory number billable to different business entities.

The subscribing business System Administrator calls the 800 number, secures connection to the IP and activates, deactivates, or suspends the WAH authorization. In setting up the service the business subscriber supplies the residence telephone number (or alternate telecommuting location telephone number) of each telecommuter, the interexchange carrier assignment of the business, the business billing number assigned to the telecommuter, the billing information such as address, department, etc., of the telecommuter, and a business account in each jurisdiction in which their telecommuters are served.

The WAH telecommuter invokes the service by dialing an access code assigned to the WAH service, such as, for example, *94. The involved Service Switching Point (SSP) responds to the access code by returning a second dial tone and the telecommuter proceeds with normal dialing of the business directory number desired (NANP). The access code is assigned a PODP (Public Office Dialing Plan) Feature Code trigger in the SSP. After dialing is complete, the trigger is hit in the SSP and the SSP queries the Integrated Service Control Point (ISCP). In the simplest case the calling party ID parameter may constitute the ANI supplied directory number of the residence of the telecommuter. This is checked by the ISCP to ensure that the calling party is authorized to utilize the service. If the caller is authorized, the business billing directory number is placed in the Charge Number parameter. The Interexchange Carrier (IXC) of the business is determined with information provided by Marketing at the time of subscription and contained in the service logic for processing interLATA calls. The ISCP further checks an Active indicator associated with the telecommuter to determine whether or not the service is activated. If the service is activated the call is routed. Calls are rated normally and billed to the business billing directory number. Calls carried by Interexchange Carriers are billed by the carriers. All WAH calls with billable time generate AMA records at the triggering SSP, including calls that do not normally generate AMA such as flat rated customers local calls, calls to repair, etc. The billing system identifies and drops the unbillable WAH AMA records. Serial triggers can occur after a WAH response is returned to the SSP but only if the carrier is a Local Exchange Carrier (LEC). If the carrier is not an LEC, then the SSP routes the call directly to the specified IXC, bypassing any subsequent triggers. This means that a WAH telecommuter cannot dial a 500 number or 710-NCS-GETS and reach the triggers for those services. In the preferred embodiment of the invention PIN entry is utilized to implement service to multiple telecommuters from a single residence directory number and voice recognition capability may be provided for improved user interface for PIN entry and update procedures.

BEST MODE FOR CARRYING OUT THE INVENTION

Figure 1:
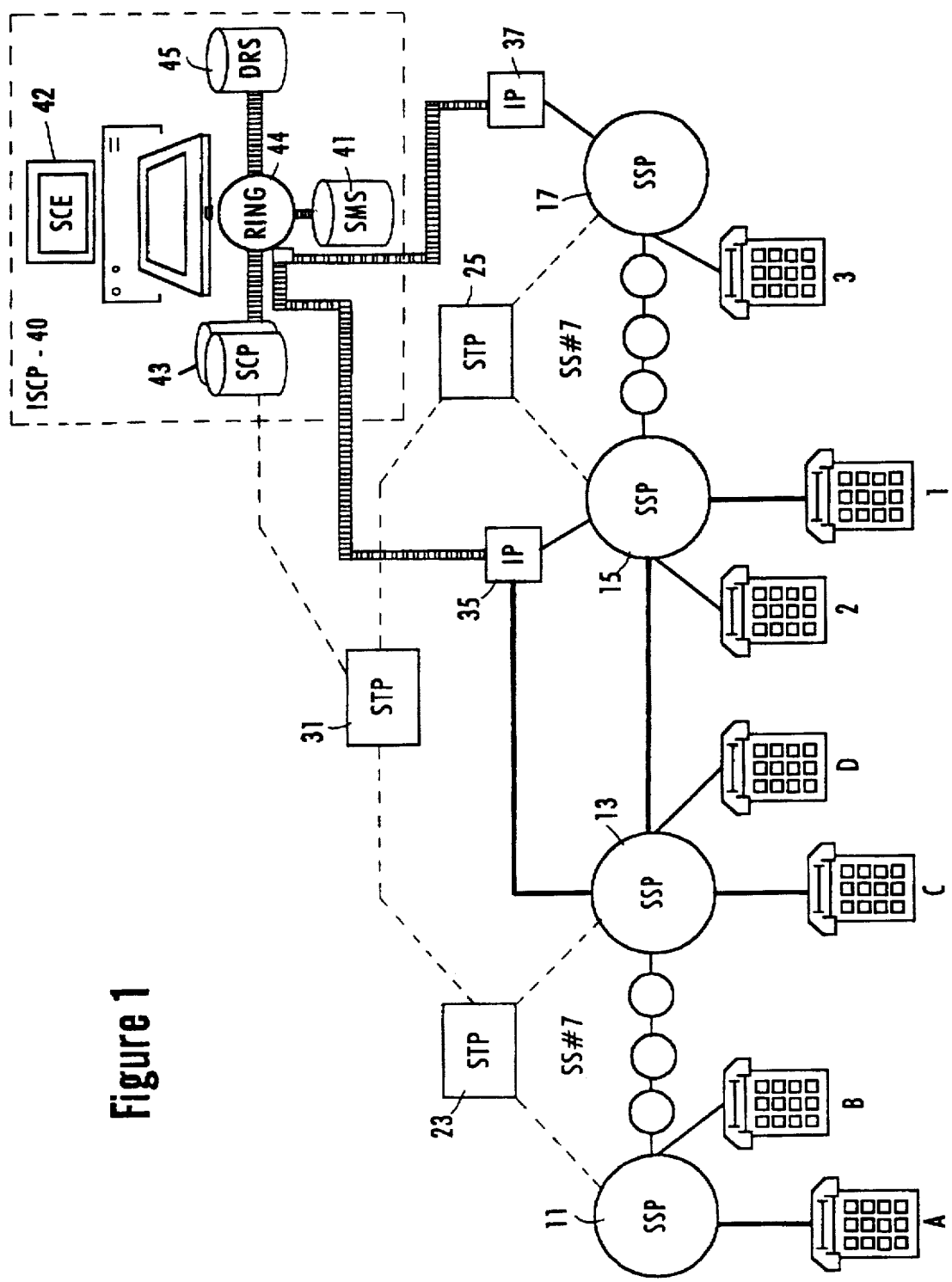
FIG. 1 shows in simplified block diagram form of an Advanced Intelligent Network system for implementation of the system and method of the invention.

The work-at-home service of the invention is implemented using an Advanced Intelligent Network (AIN) type architecture. FIG. 1 illustrates an integrated advanced intelligent network providing voice and data communications connectivity. In the typical situation, a local telephone operating company (TELCO) would deploy, operate and maintain such an integrated network. In the network shown in FIG. 1, each central office switching system (CO) 11, 13, 15, 17 is labeled as an "SSP." The Service Switching Points, referred to as SSP's, are appropriately equipped programmable switches present in the telephone network, which recognize AIN type calls, launch queries to the ISCP and receive commands and data from the ISCP to further process the AIN calls. In the illustrated embodiment, the CO-SSP's are end offices.

As shown in FIG. 1, all of the end office switches 11, 13, 15 and 17 are equipped and programmed to serve as SSP's. The illustrated embodiment is perhaps an ideal implementation which would make a variety of Advance Intelligent Network AIN services widely available at the local office level throughout the network. Other AIN implementations provide the SSP functionality only at selected points in the network, and end offices without such functionality forward calls to an SSP switching office having tandem switching capabilities.

SSP capable central office switching systems typically consist of a programmable digital switch with CCIS communications capabilities. One example of an SSP capable CO switch is a 5ESS type switch manufactured by AT&T; but other vendors, such as Northern Telecom and Seimens, manufacture comparable digital switches which could serve as the SSP's.

The SSP type CO's 11 and 13 connect to a first local area STP 23, and the SSP-CO's 15 and 17 connect to a second local area STP 25. The connections to the STP's are for signalling purposes. As indicated by the circles below STP's 23 and 25, each local area STP can connect to a large number of the SSP-CO's. The central office SSP's are interconnected to each other by trunk circuits (illustrated in FIG. 1 as bold lines) for carrying telephone services.

The local area STP's 23 and 25, and any number of other such local area STP's (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSP's or not, may function primarily as tandem type offices providing connections between trunk circuits only.

The links between the central office switching systems (CO's) and the local area STP's 23 and 25 are typically SS#7 type CCIS interoffice data communication channels. The local area STP's are in turn connected to each other and to the regional STP 31 via a packet switched network. The regional STP 31 also communicates with the ISCP 40 via a packet switched network.

The above described data signalling network between the SSP type central offices and the ISCP is preferred, but other signalling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node.

There could be one or more ISCP's per state, to avoid overloading existing CCIS data links. Alternatively, the ISCP could be implemented on a LATA by LATA basis or on a regional operating company basis, i.e. one database for the entire geographic area serviced by one of the Regional Bell Operating Companies. In fact, if federal regulations permitted, the database service could become nationwide.

As shown, the ISCP 40 includes a Service Management System (SMS) 41, a Data and Reporting System (DRS) 45 and the actual database referred to as the Service Control Point (SCP) 43. The ISCP also typically includes a terminal subsystem referred to as a Service Creation Environment or SCE 42 for programming the database in the SCP 43 for the services subscribed to by each individual customer. These components of the ISCP 40 communicate with each other via a token ring network 44. The SCP database 43 stores data tables used to control telephone services provided through the network to callers using telephone stations. Although shown as telephones in FIG. 1, the voice grade type terminals can comprise any communication device compatible with a voice trade type telephone line. As used herein, the term "telephone station" broadly encompasses telephones and any other device compatible with a voice grade telephone circuit, for example, station devices such as facsimile machines, modems etc. Also, although all of the links to the telephone stations are illustrated as lines, those skilled in communications arts will recognize that a variety of local transport media and combinations thereof can be used between the end office switches and the actual telephone stations, such as twisted wire pairs, subscriber loop carrier systems, radio frequency wireless (e.g., cellular) systems, etc.

In accord with the present invention, one or more Intelligent Peripherals (IPs) 35 and 37 are added to the network to provide one or more auxiliary call processing capabilities both for voice calls and broadband (typically video) calls. As shown in FIG. 1, two of the SSP type central offices 13 and 17 connect to intelligent Peripherals 35 and 37, respectively. In the preferred embodiment, the IP's each connect to the associated SSP switch via a primary rate Integrated Services Digital Network (ISDN) link through an appropriate interface unit in the switch. The ISDN link carries both voice and signaling data. The IP's also connect via a packet switched data communication network, such as X.25, to the ISCP 40. The X.25 data communication network forms a second signalling network separate from the SS#7 network and the network of trunk circuits interconnecting the switching offices.

A central office switching system or CO shown in FIG. 1 normally responds to a telephone service request on a local communication line connected thereto, for example an off-hook followed by dialed digit information, to selectively connect the requesting line to another selected local communication line, e.g., to establish a voice call communication link from telephone station A to telephone station B. The connection can be made locally through only the connected central office switching system. For example, for a voice telephone call from station A to station B, the SSP-CO 11 provides the call connection without any connection to another central office. When the called line connects to a distant station, for example when station A calls station C, the voice connection is made through the connected central office switching system SSP-CO 11 and at least one other central office switching system SSP-CO 13 through the telephone trunks interconnecting the two central office switches.

In the normal plain old telephone service (POTS) type call processing, the central office switching system responds to an off-hook at one of the telephone stations and receives dialed digits from the calling station. The central office switching system analyzes the received digits to determine if the call is local or not. If the called telephone station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the local central office (CO) suspends the call and sends a query message through one or more of the STP's. The query message goes to the central office to which the called station is connected, referred to as the "terminating" central office. For example, for a call from station A to station C the query would go from originating SSP-CO 11 to terminating SSP-CO 13. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices (and/or tandem offices) of the network between the calling and called stations. The receiving central office then provides a ringing signal to the called station and sends ringback tone back through the connection to the calling station.

The call processing routines discussed above are similar to those used in existing networks to complete calls between telephone stations. In an integrated voice and broadband AIN type network in accord with the present invention, these normal call processing routines would still be executed for completion of POTS calls not requiring AIN processing, service features provided by the Intelligent Peripherals, or broadband services.

In an Advanced Intelligent Network (AIN) type system, such as shown in FIG. 1, certain telephone calls receive specialized AIN type processing under control of data files stored in the SCP database 43 within the ISCP 40. In such a network, the SSP type local offices of the public telephone network include appropriate data in the translation tables for customers subscribing to AIN services to define certain call processing events identified as AIN "triggers". Using the translation table data from its memory, the SSP will detect such triggering events during processing of calls to or from such AIN service subscribers.

The SSP type switches can recognize a variety of events as triggers for activating a query and response type AIN interaction with the ISCP. A number of different AIN triggers are used, depending on the precise type of service the AIN will provide a particular subscriber. For example, if a subscriber has a speech responsive autodialing service, an off-hook immediate trigger might be stored in the translation table file for that subscriber in the SSP. The SSP would detect the trigger each time the subscriber goes off-hook on that line and then attempt to obtain further instructions from the ISCP.

For ordinary voice grade telephone service calls, there would be no event to trigger AIN processing; and the local and toll office switches would function normally and process such calls as discussed above, without referring to the SCP database for instructions. In a first mode of operation, an SSP type office (CO or tandem) which detects a trigger will suspend call processing, compile a TCAP formatted call data message and forward that message via a common channel interoffice signalling (CCIS) link and STP(s) to the ISCP 40 which includes the SCP database 43. The ISCP accesses its stored data tables to translate the received message data into a call control message and returns the call control message to the office of the network via CCIS link and STP(s). The SSP then uses the call control message to complete the particular call through the network. For AIN calls requiring a processing feature provided by the peripheral platform, the call control message would instruct the SSP to route the call to the associated peripheral platform.

In the network of FIG. 1, the ISCP 40 transmits a "SEND to RESOURCE" type TCAP message instructing an SSP, such as SSP 17, to access a resource and collect digits. This message identifies a particular resource, in this case an ISDN type voice channel to the associated peripheral platform 37. Each time the ISCP sends such a "SEND to RESOURCE" message to an SSP, the ISCP concurrently sends a message through the X.25 data link to the associated peripheral platform. This message tells the platform what message to play on the specified ISDN channel at that time. If the message announcement platform has a text-to-speech converter, the announcement could take the form of virtually any desired script.

The IP 37 performs DTMF digit collection and voice announcement functions on telephone calls, for a wide variety of telephone services available through the network. As discussed in more detail later, the IP may also offer voice recognition capabilities for such interactions. Advanced implementations of the IP will also include various data communications means, e.g., for FAX mail services, screen-phone services, etc. The illustrated preferred embodiment includes two signalling communications systems carrying data to and from the ISCP 40. The communications links of the first such signalling network appear in the drawing as dashed lines, and the communications links of the second such signalling network appear in the drawing as lines formed by parallel bars. The first signalling network provides communications between the ISCP 40 and the SSP's 11, 13, 15, 17 and between the individual SSP's 11, 13, 15, 17. The second signalling network provides communications between the ISCP 40 and the IP's 35, 37. More specifically, the SCP 43 connects to the SSP's via the SS#7 network and the STP's 44. For the second signalling communication system a router shown as a small rectangle on the ring 44 provides a two-way communication connection to a data network, for example an Ethernet (IEEE 802.3) type local area network, another token ring, or a mixture of token ring and local area network, etc., going to the individual IP's 35, 37. Other types of high speed data network can be used between the ISCP 40 and the IP's 35, 37. Typically, the second signalling network will provide higher capacity data transport than the first signalling communication network.

One IP may connect to one SSP. Alternatively, an IP may connect to two or more switching systems, or two or more IP's may connect to the same switching office. For example, in the illustrated network, the IP 35 connects to two SSP type central office switching systems, 13, 15. The IP 37 connects to one SSP type central office switching system 17. The precise number of IP's in the network and the number thereof connected to different switching systems is determined by projected traffic demands for IP service features from the subscribers' lines connected to the various switching systems.

In the preferred embodiment, the connection from the IP to the SSP would utilize a primary rate ISDN type trunk line for carrying both voice channels and signaling information. However, a number of alternate implementations of this connection can be used. For example, the connection may take the form of a T1 circuit carrying a number of Multiplexed Centrex line channels. If additional data signalling is necessary from the switch to the IP, a Simplified Message Desk Interface (SMDI) link can be provided. SMDI is a standard form of maintenance port, available on many types of telephone switching systems, through which calling party number information can be supplied. For older switching systems not capable of call transfer through ISDN signalling or signalling on T1 Centrex lines, an additional switch could be added between the IP and the SSP.

The AIN topology illustrated in FIG. 1 is exemplary in nature, and other network topologies can be used. For example, the illustrated networks include SSP functionality in each of the end office switching systems. In some networks, at least some of the end offices may not have SSP capabilities. Each such end office would connect to a trunk which in turn feeds calls to a tandem switching system with SSP capabilities. The SSP tandem communicates with the ISCP, as in the implementation described above. For the SSP capable end office switches that may be present in the network, they communicate directly with the ISCP, in the same manner as in the embodiment of FIG. 1. In such networks, each peripheral announcement platform or IP could connect to one or more of the non-SSP end offices, one or more SSP capable end offices and/or to the SSP capable tandem. The SSP capable tandem office switch is a digital switch, such as the 5ESS switch from AT&T; and the non-SSP type end offices might be 1A analog type switches.

Figure 2A:
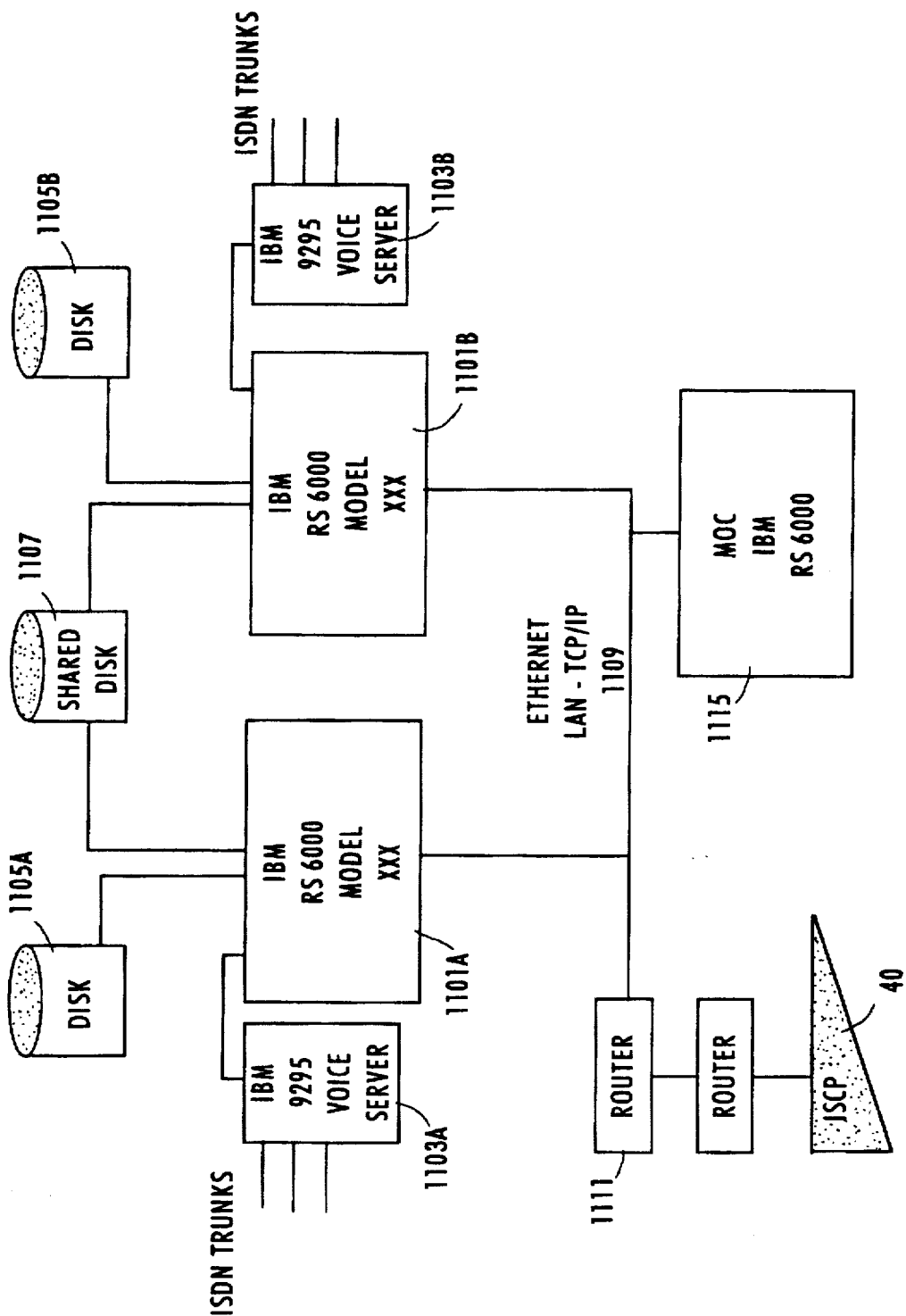
FIG. 2A is a schematic block diagram of one embodiment of an intelligent peripheral for use in the Advanced Intelligent Network of FIG. 1 in implementation of the present invention.

FIG. 2A illustrates a first, preferred embodiment of the IP used in the network of FIG. 1. In this implementation, the IP will consist of two or more general purpose computers 1101A, 1101B, such as IBM RS-6000's. Each general purpose computer will include a digital voice processing card for sending and receiving speech and other audio frequency signals, such as an IBM D-talk 600. Each voice processing card will connect to a voice server card 1103A or 1103B which provides the actual interface to T1 or primary rate interface ISDN trunks to the SSP type switching office. The plurality of computers may have associated dedicated disk storage 1105A, 1105B, and the IP will included a shared disk memory 107.

Each computer will also include an interface card for providing two-way communications over an internal data communications system, an Ethernet type local area network 1109. The Ethernet carries communications between the individual computers and between the computers and a router which provides an interconnection to the second signalling communications network going to the ISCP. A router 1111 connected to local area network 1109 provides a two-way coupling of the IP to the second data network, for example an Ethernet (IEEE 802.3) type local area network, a token ring, or a mixture of token ring and local area network, etc., at least for communications to and from the ISCP 40. If the X.25 network 220 serves as the signaling network between the ISCP and the IP's, then only one such router connected to that network would be included within the IP. Alternatively, the communications to and from the ISCP may transit a network separate from the X.25 network 220 used for control signaling relating to the broadband services. In such a case, the IP would include the router 1109 connected to the second signaling network, i.e. the data network going to the ISCP, as well as a separate additional router (not shown) for coupling the IP to the X.25 network 220 (or to the ATM switch 410 if signaling is moved to that switch to eliminate the X.25 network 220).

The IP may also include another general purpose computer 1115 configured as a terminal subsystem, for use as a maintenance and operations center (MOC) and providing operations personnel access to the IP. The number of processors provided in the IP and the number of voice servers will depend on project service demands. One additional processor and associated voice server will be provided as a backup (not shown).

Each general purpose computer 1101A, 1101B will run a node manager, an IP/ISCP Interface program, appropriate voice processing software and a variety of application software modules to offer the proposed services of the IP. The central administrator or "Node Manager" program module, running on each computer, will monitor and control the various IP resources and operations. The digital voice processing card and associated software will provide speech synthesis, speech recognition capabilities and DTMF tone signal reception, for use in a number of different applications. The speech synthesis and DTMF tone signal reception, for example will replace the announcement and digit collection functions of the SSP switches in various existing AIN services. These functions can also be used to permit subscribers to input parameters relating to their broadband services and/or to provide a telephony based interface to the broadband services provider's equipment. The general purpose computers and associated circuits will also run a variety of other types of service program modules, for example a voice mail server module and/or a fax mail server module.

Figure 2B:
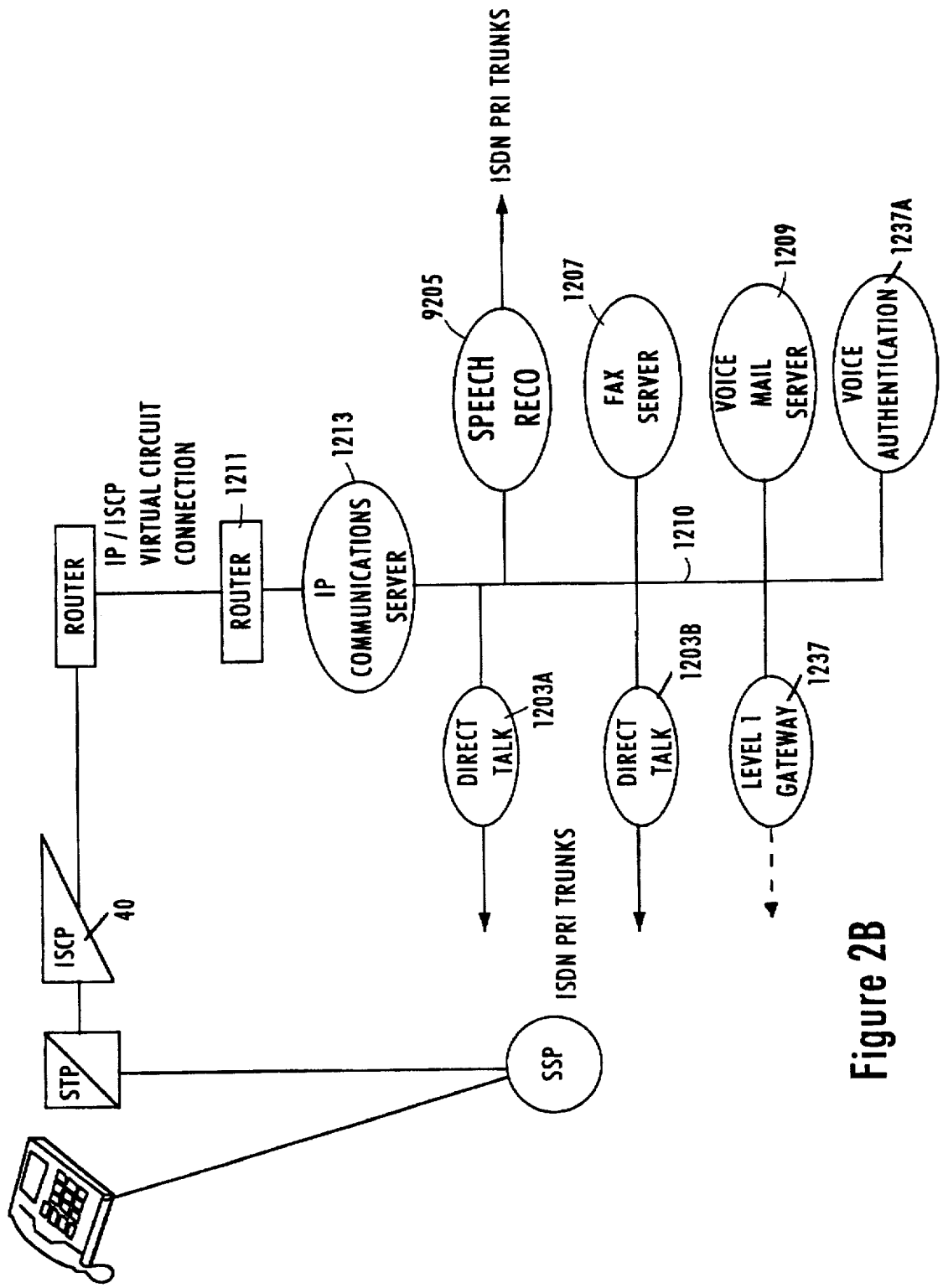
FIG. 2B is a schematic block diagram of an alternate embodiment of an intelligent peripheral for use in the present invention.

FIG. 2B illustrates an alternate embodiment of the IP used in the network of FIG. 1. The alternate architecture utilizes separate modules for different types of services or functions, for example, one or two Direct Talk type voice server modules 1203A, 1203B for interfacing the trunk to the SSP, a separate module 1205 for speech recognition, a server module 1209 for voice mail, and another server 1207 for fax mail services, a level 1 gateway module 1237 for controlling broadband services, etc. The various modules communicate with one another via an internal data communication system 1210, which again may be an Ethernet type local area network.

The Direct Talk modules 1203A, 1203B provide voice message transmission and dialed digit collection capabilities, as in the earlier embodiment. The modules 203A, 203B also provide line interfaces for communications to and from those servers which do not incorporate line interfaces. For example, for facsimile mail, the Direct Talk module connected to a call would demodulate incoming data and convert the data to a digital format compatible with the internal data communication network 1210. The data would then be transferred over network 1210 to the fax server 1207. For outgoing facsimile transmission, the server 1207 would transfer the data to one of the Direct Talk modules over the network 1210. The Direct Talk module would reformat and/or modulate the data as appropriate for transmission over the ISDN link to the SSP. The Direct Talk modules provide a similar interface function for the other servers, such as the voice mail server 1209.

The illustrated IP also includes a communication server 1213. The communication server 1213 connects between the data communication system 1210 and the router 1211 which provides communications access to the second signalling communication system and the ISCP 40 and other IP's which connect to that signalling communication system. The communication server 1213 controls communications between the modules within the IP and the second signalling communication system. Again, if the X.25 network 220 serves as the signaling network between the ISCP and the IP's, then only one router 1211 and the communication server 1213 are included within the IP. Alternatively, the communications to and from the ISCP may transit a network separate from the X.25 network 220 used for control signaling relating to any broadband services. In such a case, the IP would include the communication server 1213 and router the 1211 connected to the second network going to the ISCP, and the level 1 gateway module 1237 would include a separate additional router (not shown). This additional router would provide a two-way data coupling to the X.25 network 220 (or to the ATM switch 410 if signaling is moved to that switch to eliminate the X.25 network 220) as represented by the dotted line arrow from the gateway module 1237 in FIG. 2B.

In each of the proposed architectures, the SSP switch would route voice grade telephone calls to the different elements of the IP in response to instructions from the ISCP. In the initial implementation using general purpose computers (FIG. 2A), each of which offers all service functionalities, the decision to route to a particular one of the computers would be a resource availability/allocation decision. If necessary data can be exchanged between the computers via the internal data communications network, e.g., if a message for a particular subscriber's service is stored in the disc memory associated with one computer but the other computer is actually processing the call. In the second implementation (FIG. 2B), however, the ISCP would instruct the SSP to route the call to the particular line to the specific module capable of providing a calling customer's individual service. For example, if the subscriber has some form of speech recognition service, the call would be routed to the speech recognition module 1205. If the subscriber has a voice mail service, however, the ISCP would instruct the SSP to route the call to one of the lines going to one of the voice server modules 1203A, 1203B. The module 1203A, or 1203B would receive outgoing voice messages from the voice mail server 1209 for transmission to the caller. The module 1203A or 1203B would decode DTMF signals and supply appropriate data to the voice mail server, for control purposes. The module 1203A or 1203B would also format incoming voice messages for transmission over internal network 210 and storage by server 1209.

One example of an AIN system for implementing the invention is illustrated in FIG. 1 which may represent a Public Switched Telephone Network (PSTN). Local telephone lines connect individual telephone stations in the network to the closest central office (CO). Each CO connects via trunk circuits (shown in the drawing as bold lines) to one or more of the other COs, and each CO has a CCIS data link to an STP. The trunk circuits carry large numbers of telephone calls between the COs. CCIS data communication is provided via links to signaling transfer points (STPs). In FIG. 1 each of the COs are labelled as an "SSP."

In setting up the system to implement the invention, a business desiring to subscribe to the service contacts the business or marketing office of the local telephone company or PSTN and negotiates its implementation. The business subscriber or employer of the telecommuter provides to the telephone company business office certain preliminary information. This includes the residence telephone number or alternate location telephone number or directory number of each telecommuter which it desires to authorize; the interexchange carrier assignment of the business; the business billing or secondary number assigned to each telecommuter; the billing information, i.e., address, department, etc., of each telecommuter; a business account in each jurisdiction in which their telecommuters are served; the date of implementation with respect to each residence directory number (and ID or PIN where applicable) to be authorized; and the ID of a business subscriber System Administrator. The ID of the System Administrator may constitute a directory number which is authorized to access the WAH control functions which the telephone company provides for the service either through an Intelligent Peripheral (IP) or DMS switch.

Figure 4:
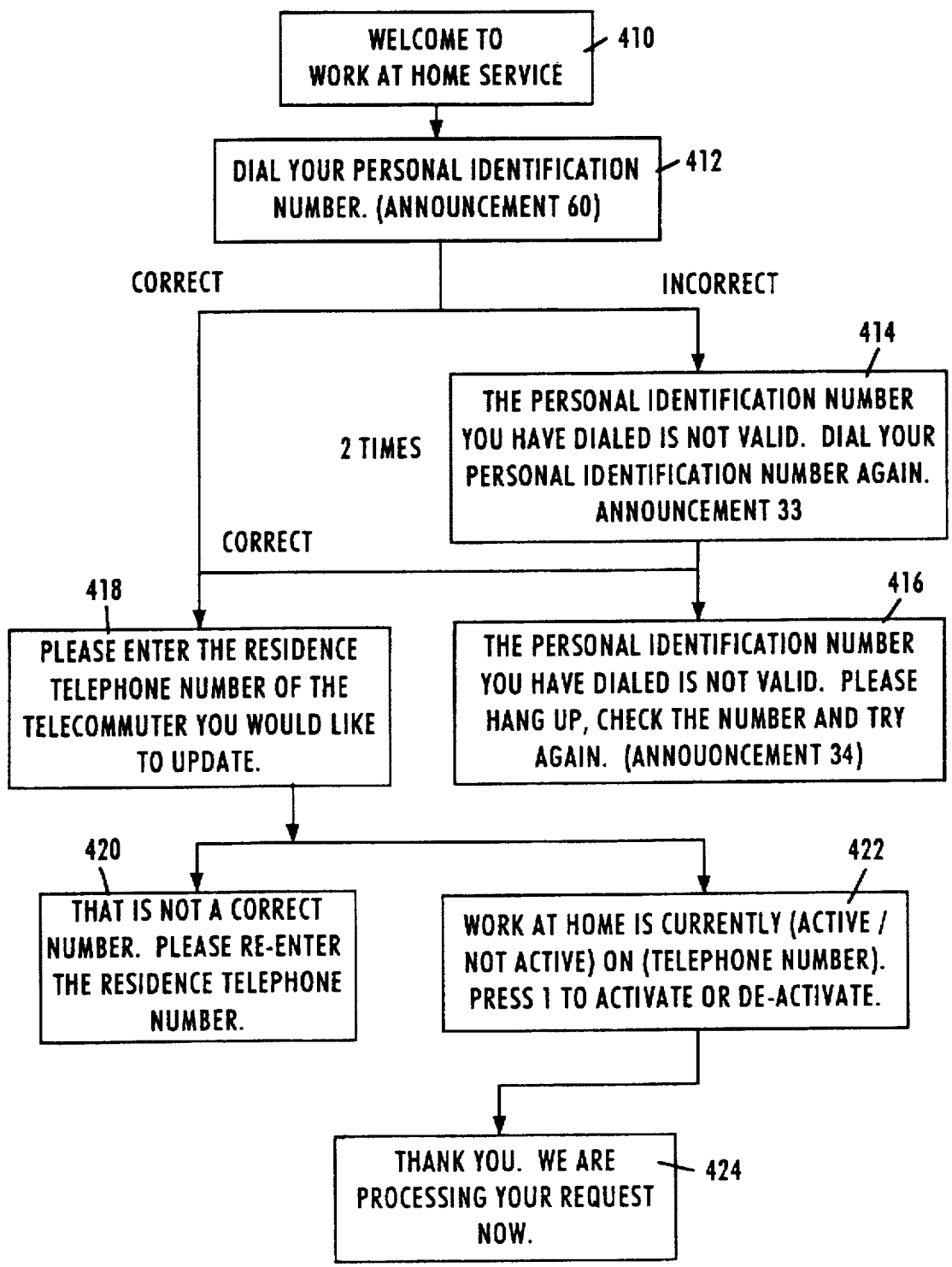
FIG. 4 is a flow chart depicting the routine of an activate-deactivate script used by the System Administrator.

Following the establishment of the service parameters the System Administrator may control the telecommuting process in the manner illustrated in the flow diagram of FIG. 4. As part of the service negotiation procedure the new business subscriber is provided with an 800 number with which to reach the telephone company control function at the Intelligent Peripheral. Upon the System Administrator dialing this function from a designated line or directory number which constitutes the System Administrator ID, the controller, such as an IP shown in FIG. 2, responds with a prompt such as "welcome to the work-at-home service, dial your personal identification number." This is indicated at 410 and 412 in FIG. 4. If the personal identification number constitutes the directory number of the authorized system administrator line, this will be supplied to the controller via Caller ID or ANI and thus the actual request for an identification shown at 412 may be unnecessary. In either event, the identification is provided. If the identification is incorrect the caller may receive a prompt such as: "The personal identification number you have dialed is not valid. Dial your personal identification number again." This is indicated at 414. If the second attempt to dial the number also produces an invalid number a further prompt is provided at 416 and the call is terminated.

If the personal identification number ascertained by the opening prompt is correct the calling System Administrator is invited to enter the residence telephone number of the telecommuter which it is desired to establish or update. This is indicated at 418. In the event that the supplied residence number is not a residence directory number previously supplied to the telephone company in establishment of the service, the caller receives an invalid response such as indicated at 420. If the entered residence telephone number is correct, the caller is advised the current status of the service to that number, i.e., active or not active, as indicated at 422. The caller is invited to "press 1" to change the status, i.e., to activate or deactivate the service. This signal is acknowledged at 424 and the requested action is performed.

Figure 6:
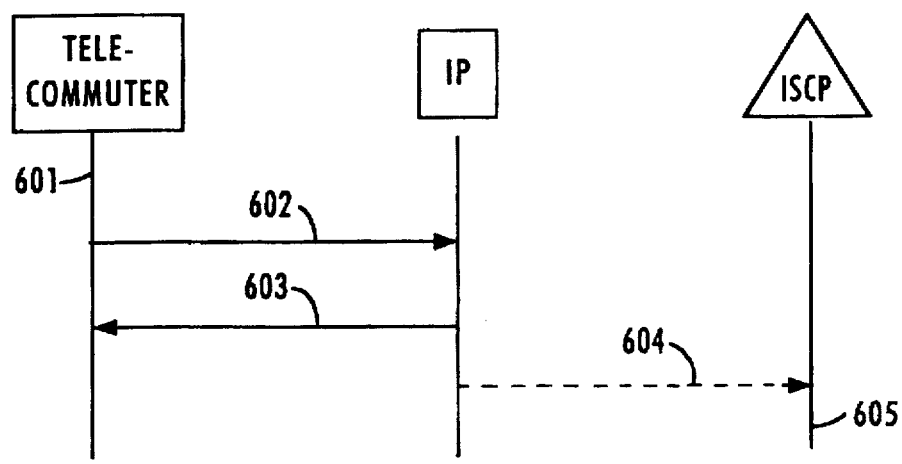
FIG. 6 is a call flow chart indicating the steps in the Systems Administrator activating or deactivating a service.

The foregoing procedure is further illustrated in the call flow diagram depicted in FIG. 6. Referring to that figure, the System Administrator places a call to the 800 number from the assigned System Administrator telephone or directory number at 601. The call terminates on a port on the IP as indicated at 602. The IP performs the activate-deactivate script and the System Administrator responds to the prompt as indicated at 603. The IP thereupon queries the ISCP over the 1129+ interface with the updated activate-deactivate information at 604. The ISCP thereupon updates the telecommuters activation indicator at 605.

Figure 3:
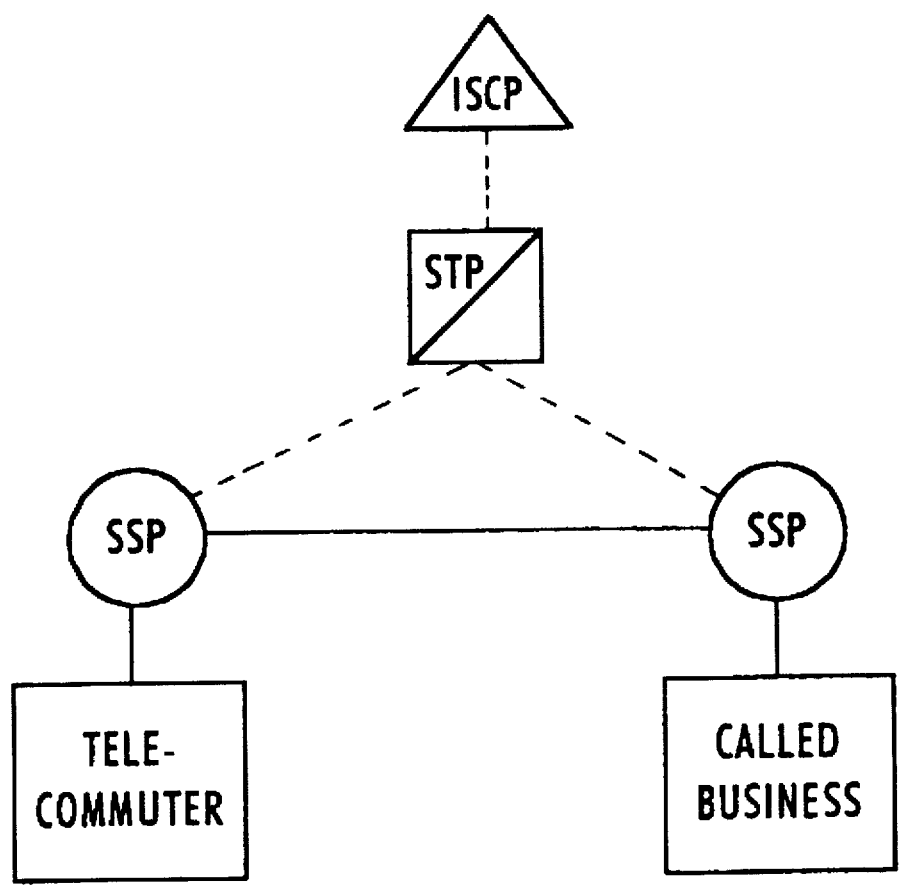
FIG. 3 is a simplified schematic diagram of the telephone network of FIG. 1 showing the relationship of the telecommuters residence, called directory number, and billing.

In the use of the service by a telecommuter the WAH subscriber invokes the service by dialing the access code which has been assigned, such as *94. Referring to FIG. 3, the SSP returns a second dial tone to the calling party and the normal dialing NANP is performed. By way of example the dialing in this figure is shown as *94+236-3241. The SSP is triggered when the dialing is complete and queries the ISCP via the STP in FIG. 3. The ISCP consults its subscriber database, confirms that the calling party ID parameter is correct, that the caller subscribes to the service and that the service is activated. The ISCP thereupon performs its service logic and places the business billing or secondary telephone or directory number in the Charge Number Parameter. The Interexchange Carrier of the business is determined and instructions regarding the same is returned where appropriate. The ISCP thereupon returns a TCAP response to the SSP whereupon the call is routed and completed to the called number 236-3241. The appropriate prearranged billing data is thereupon entered into the SSP switch journal and transferred to the AMA.

Figure 5:
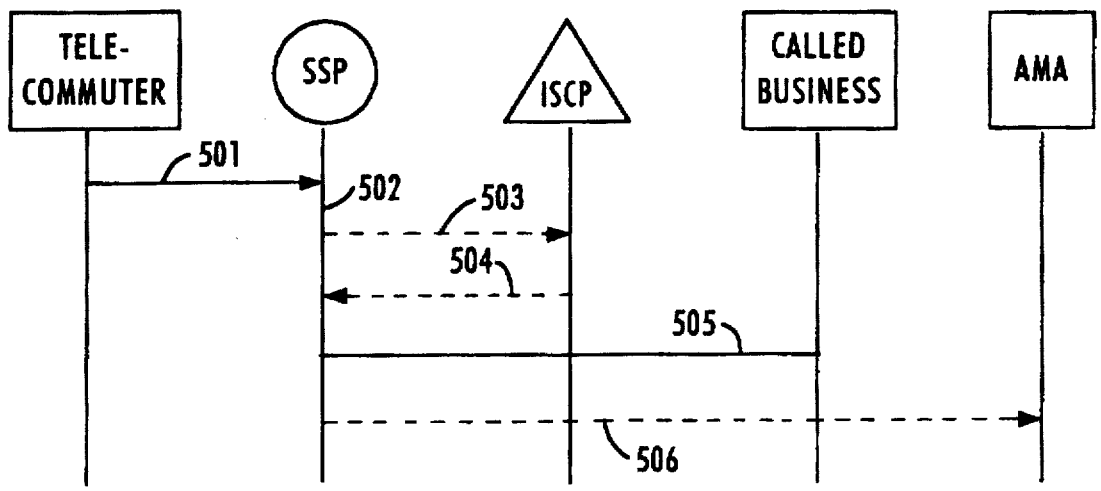
FIG. 5 is a call flow diagram indicating the steps in operation of the system of the invention according to one embodiment.

FIG. 5 depicts a call flow diagram of these steps. Referring to FIG. 5 the telecommuter call *94+236-3241 is indicated at 501. At 502 the call hits a PODP trigger in the SSP. The SSP sends a TCAP inquiry to the ISCP at 503. At 504 the ISCP sends the SSP a TCAP routing response message containing the business directory number to be billed, the Interexchange Carrier to carry the call, for interLATA calls, and the SLP ID 919. The SSP then routes the call to the called party at 505. The billing information is sent from the SSP to the AMA at 506.

According to another feature of the invention, provision is made to allow a single residence line to be utilized to provide WAH facilities for multiple businesses. This permits WAH use of the line by multiple telecommuters employed by different businesses or by a single telecommuter who may work for multiple businesses. According to one embodiment of the invention such a service is implemented by using an ID parameter which constitutes the directory number of the authorized residence line in addition to a PIN. When the business office of the telephone company negotiates the service with a business subscriber and is provided with the residence directory number, a check is made to establish whether or not a secondary or business number has already been assigned for that residence number, and if so, the PIN for that secondary business number. A different PIN is then arranged for the second business directory number. All PINs are registered in the database for the service in the ISCP.

Figure 7:
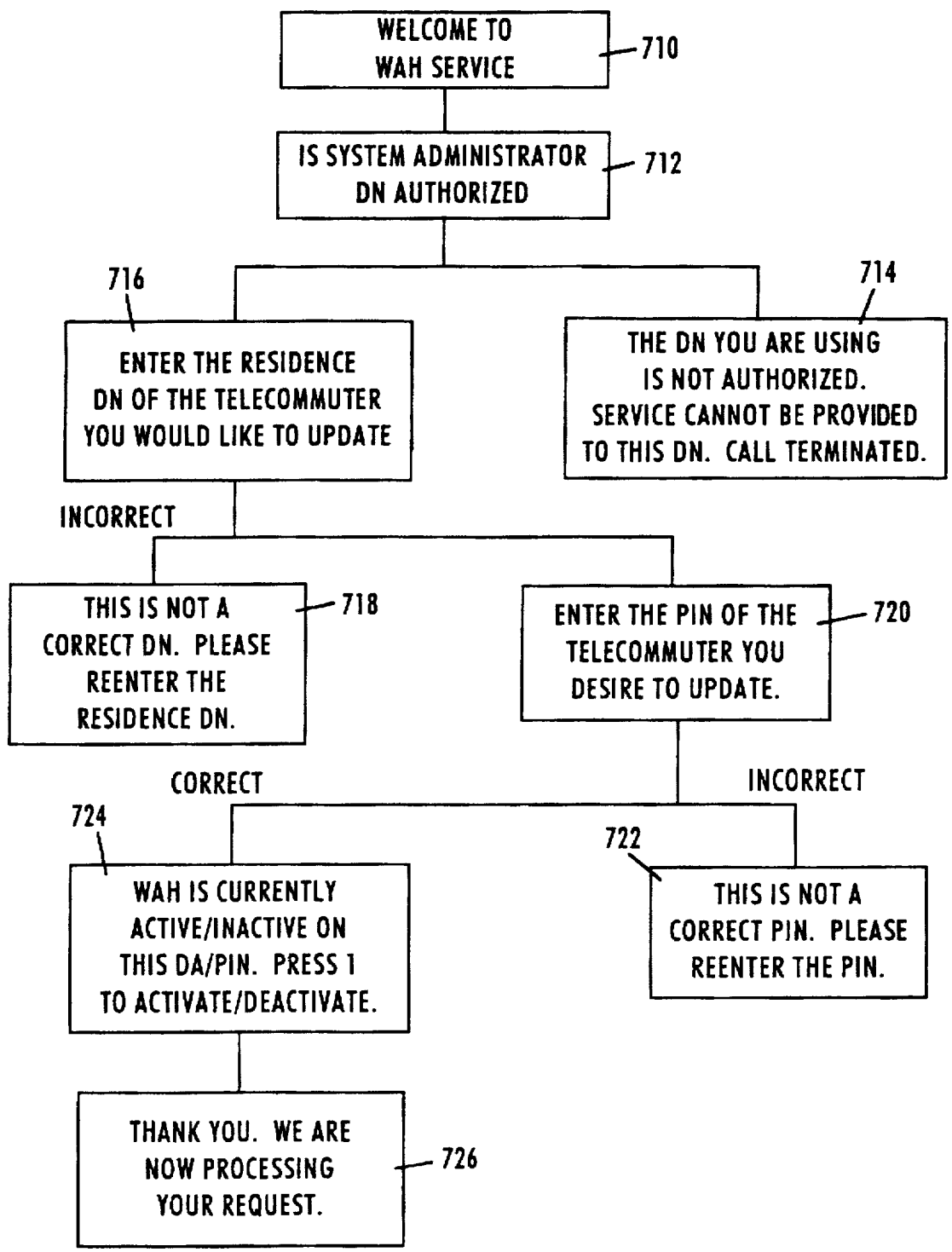
FIG. 7 is a flow diagram showing activation-deactivation of the service by the System Administrator in an embodiment of the invention wherein a single directory number serves multiple telecommuters or business billing directory numbers.

The System Administrator's control of activation or deactivation of the service in this embodiment of the invention is illustrated in the simplified flow chart shown in FIG. 7. Referring to FIG. 7 a System Administrator for a subscriber business desiring to activate or deactivate the WAH service of a particular telecommuter and business dials the predesignated 800 number and connects to the IP. This is met with a prompt such as "Welcome to the work-at-home service" as indicated at 710. The IP checks its database to ascertain whether or not the calling System Administrator directory number is authorized as indicated at 712. If the directory number used by the System Administrator is not authorized, access is denied at 714 with a prompt such as "The directory number you are using is not authorized. Work-at-home service cannot be provided to this directory number." This call is then terminated. If the directory number used by the System Administrator is authorized, as determined at 712, the IP requests the System Administrator to enter the residence directory number of the telecommuter which it is desired to update. This is indicated at 716. The entered directory number is then checked against the database of the IP. If the number if incorrect the calling System Administrator is so advised and requested to re-enter the residence directory number at 718. A predetermined number of retries is permitted. If the correct number is not received within that time the call is terminated.

If the directory number entered at 716 is correct, the calling System Administrator is then requested to enter the PIN of the telecommuter which it is desired to update. This is indicated at 720. The PIN is entered by DTMF. If the PIN is incorrect this is announced by an appropriate prompt as shown at 722. A predetermined number of retries is permitted before the call is terminated. If the PIN entered at 720 is correct, the calling System Administrator is advised as to the current status of the identified residence directory number and telecommuter PIN and requested to press a designated DTMF key in order to change that condition. This is indicated at 724. Upon receiving this DTMF signal the IP plays a prompt announcing that the requested processing is being implemented as indicated at 726.

Figure 8:
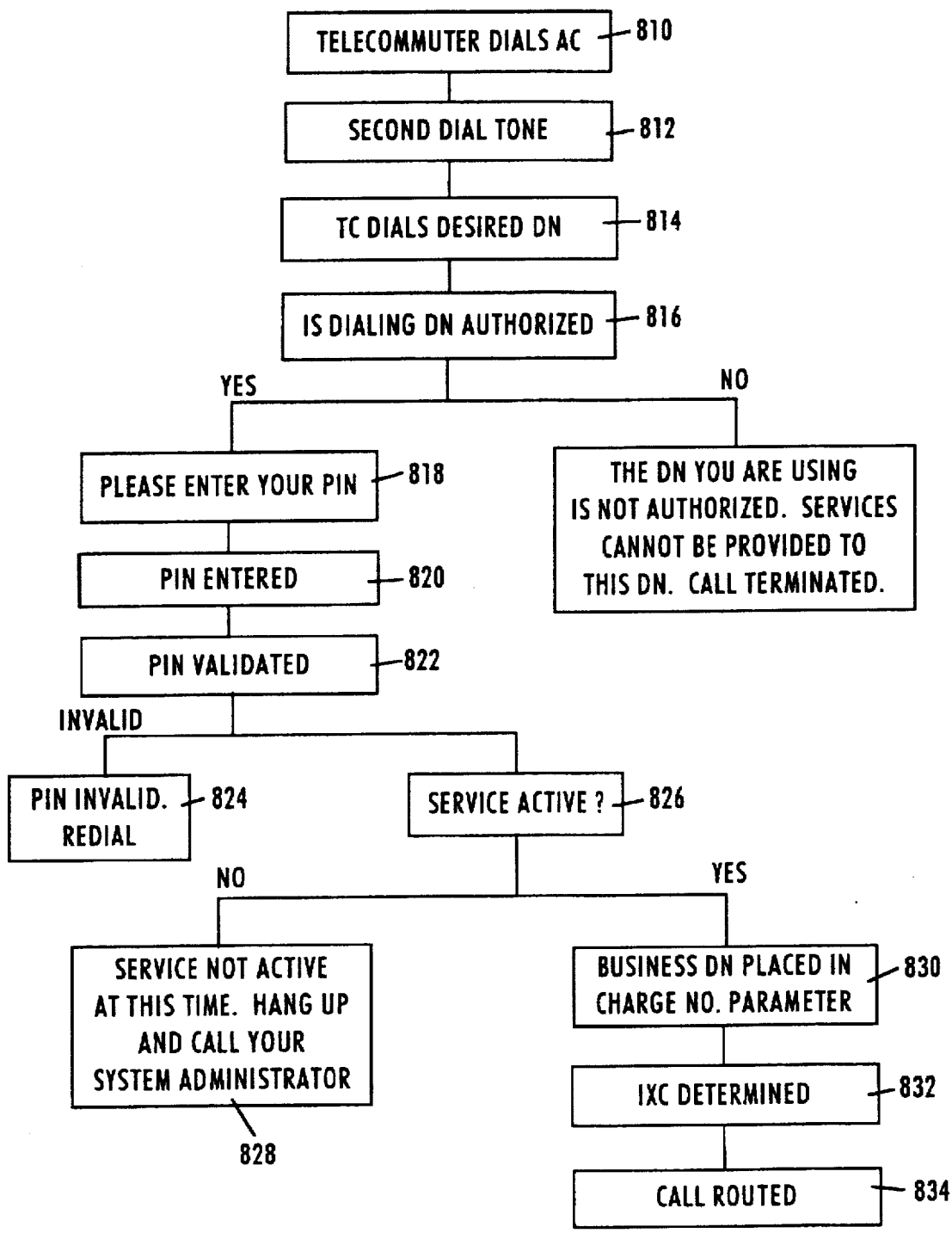
FIG. 8 illustrates in flow diagram form the processing of a telecommuter business call according to one embodiment of the invention.

The processing of a WAH telecommuter business call according to this embodiment of the invention is illustrated in flow chart form in FIG. 8. Referring to FIG. 8, a telecommuter dials the WAH access code *94 at 810, receives a second dial tone at 812, and dials the desired directory number to make a business call at 814. A determination is made as to whether or not the calling directory number, which is provided by automatic number identification (ANI), is authorized and whether or not one or more PINs are established for this director number. If the directory number is not authorized the calling party is so advised in a manner similar to that described in connection with FIG. 7 and the call is terminated. If the directory number is authorized and PIN numbers are established the ISCP directs the IP or the DMS switch to play a prompt requesting the entry of the caller's PIN. This is indicated at 818. The caller enters the PIN at 820. The ISCP reviews the PIN at 822.

If it is determined that the PIN is not valid, the caller is so informed and requested to redial the PIN at 824. As previously described, the caller is given a predetermined number of attempts in which to dial a valid PIN before the call is disconnected. If the ISCP determines that the PIN is valid a determination is made at 826 as to whether or not the service is active. If the service is inactive, the caller is so advised and notified that the service cannot be utilized at the time. The caller may be further advised to contact the appropriate employer or System Administrator. This is indicated at 828. If it is determined that the service is active at 826, processing then continues at 828, 830 and 832. Thus, the business billing directory number is placed in the Charge Number parameter for billing purposes, the Interexchange Carrier is determined and the call is routed. It will be appreciated that this embodiment of the WAH service permits a telecommuter to efficiently effect billing of a large number of businesses or calls from a single residence number. It is not necessary that the telecommuter be an actual employee of the involved businesses, as may be the case in an independent contractor type situation where, for example, the telecommuter may be a consultant having primary employment with one employer and serving as an independent contractor consultant to multiple other businesses.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. In a communications network comprising:

local communication lines, a first plurality of said lines being connected to residences and having residence directory numbers and a second plurality of said lines being connected to businesses and having business directory numbers including business billing numbers and system administrator directory numbers for system administrators associated with said businesses;

a plurality of interconnected central office switching systems connected to said local communication lines;

a central control separate from the central offices, said central control comprising a database storage storing call processing data associated with said communication lines for control of call processing through one or more of said central office switching systems; and a peripheral platform connected to at least one of the central office switching systems and providing at least one auxiliary-call processing capability for said central office switching system, said peripheral platform including a database storage;

a call processing method comprising the steps of:

storing in database storage in said communications network for each of a plurality of said residence directory numbers at least one first identification parameter;

storing in database storage in said communications network for each of said first identification parameters a business billing directory number;

storing in database storage in said communications network for each of said business billing directory numbers at least one of said system administrator directory numbers for a system administrator associated with said business billing directory number; and activating a billing service for a business associated with one of said business billing directory numbers by (a) connecting to said peripheral platform via one of said local communication lines associated with a system administrator directory number identified with said business billing directory number in said storage of business billing directory numbers and system administrator directory numbers in said communications network, and (b) identifying via said one of said local communication lines associated with a system administrator directory number a residence directory number and a first identifying parameter which are identified with said business billing directory numbers in said storage of billing business directory numbers and first identifying parameters in said communications network.

2. A method according to claim 1 wherein said first identifying parameter is a Personal Identification Number (PIN) for a resident of the residence employed by a business associated with the business billing directory number.

3. A method according to claim 2 wherein a resident of said residence also has a PIN different than said first named PIN, said different PIN being associated with a different business billing directory number than the business associated with said first named PIN.

4. A method according to claim 1 wherein a call is implemented via said activated billing service by the steps of:
dialing from a stored residence directory number a predetermined access code followed by the directory number of a called party;
comparing the residence directory number from which said dialing originated with residence directory numbers stored in database storage in said communications network;
on a match being established in said residence directory numbers identifying a business billing directory number corresponding to the matching residence directory numbers;
entering from said residence directory number from which said dialing originated a first identification parameter;
comparing said entered first identification parameter with first identification parameters stored in database storage in said communications network;
on a match being established in said first identification parameters, processing the call initiated by said dialing and billing said call to the business billing directory number corresponding to said matching first identification parameters.

5. In a communications network comprising:
local communication lines, a first plurality of said lines being connected to residences and having residence directory numbers and a second plurality of said lines being connected to businesses and having business directory numbers including business billing numbers and system administrator directory numbers for system administrators associated with said businesses;
a plurality of interconnected central office switching systems connected to said local communication lines;
a central control separate from the central offices, said central control comprising a database storage storing call processing data associated with said communication lines for control of call processing through one or more of said central office switching systems; and
a peripheral platform connected to at least one of the central office switching systems and providing at least one auxiliary call processing capability for said central office switching system, said peripheral platform including a database storage;
a call processing method comprising the steps of:
storing in database storage in said communications network for each of a plurality of said residence directory numbers one or more first identification parameters;
storing in database storage in said communications network for each of said first identification parameters a billing business directory number;
storing in database storage in said communications network for each of said business billing directory numbers at least one of said system administrator directory numbers for a system administrator associated with said business billing directory number;
dialing from a stored residence directory number a predetermined access code followed by the directory number of a called party;
comparing the residence directory number from which said dialing originated with residence directory numbers stored in database storage in said communications network;
on a match being established in said residence directory numbers identifying a business billing directory number corresponding to the matching residence directory numbers;
entering from said residence directory number from which said dialing originated a first identification parameter;
comparing said entered first identification parameter with first identification parameters stored in database storage in said communications network;
on a match being established in said first identification parameters processing the call initiated by said dialing and billing said call to the business billing directory number corresponding to said matching first identification parameters.

6. In a communications network comprising:
local communication lines, a first plurality of said lines being connected to residences and having residence directory numbers and a second plurality of said lines being connected to businesses and having business directory numbers including business billing numbers and system administrator directory numbers for system administrators associated with said businesses;
a plurality of interconnected central office switching systems connected to said local communication lines;
a central control separate from the central office switching systems, said central control comprising a database storage storing call processing data associated with said communication lines for control of call processing through one or more of said central office switching systems; and
a peripheral platform connected to at least one of the central office switching systems and providing at least one auxiliary call processing capability for said central office switching system, said peripheral platform including a database storage;
a call processing method comprising the steps of:
storing in database storage in said communications network for at least one of said residence directory numbers a pair of different first identification parameters;
storing in database storage in said communications network for each of said first identification parameters a billing business directory number;
storing in database storage in said communications network for each of said business billing directory numbers at least one of said system administrator directory numbers for a system administrator associated with said business billing directory number;
dialing from a stored residence directory number a predetermined access code followed by the directory number of a called party;

comparing the residence directory number from which said dialing originated with residence directory numbers stored in database storage in said communications network;

on a match being established in said residence directory numbers identifying a business billing directory number corresponding to the matching residence directory numbers;

entering from said residence directory number from which said dialing originated a first identification parameter;

comparing said entered first identification parameter with first identification parameters stored in database storage in said communications network;

on a match being established in said first identification parameters processing the call initiated by said dialing and billing said call to the business billing directory number corresponding to said matching first identification parameters.

7. In a communications network comprising:

local communication lines, a first plurality of said lines being connected to residences and having residence directory numbers and a second plurality of said lines being connected to businesses and having business directory numbers including business billing numbers and system administrator directory numbers for system administrators associated with said businesses;

a plurality of interconnected central office switching systems connected to said local communication lines, said central offices including program controlled switches having database storage; and a central control separate from the central office switching systems, said central control comprising a database storage storing call processing data associated with said communication lines for control of call processing through one or more of said central office switching systems and additional data;

a call processing method comprising the steps of:

storing in database storage in said communications network for each of a plurality of said residence directory numbers at least one first identification parameter;

storing in database storage in said communications network for each of said first identification parameters a billing business directory number;

storing in database storage in said communications network for each of said business billing directory numbers at least one of said system administrator directory numbers for a system administrator associated with said business billing directory number;

dialing from a stored residence directory number a predetermined access code followed by the directory number of a called party;

comparing the residence directory number from which said dialing originated with residence directory numbers stored in database storage in said communications network;

on a match being established in said residence directory numbers identifying a business billing directory number corresponding to the matching residence directory numbers;

entering from said residence directory number from which said dialing originated a first identification parameter;

comparing said entered first identification parameter with first identification parameters stored in database storage in said communications network;

on a match being established in said first identification parameters processing the call initiated by said dialing and billing said call to the business billing directory number corresponding to said matching first identification parameters.

8. In a communications network comprising:

local communication lines, a first plurality of said lines being connected to residences and having residence directory numbers and a second plurality of said lines being connected to businesses and having business directory numbers including business billing numbers and system administrator directory numbers for system administrators associated with said businesses;

a plurality of interconnected central office switching systems connected to said local communication lines, said central offices including program control switches having database storage; and a central control separate from the central office switching systems, said central control comprising a database storage storing call processing data associated with said communication lines for control of call processing through one or more of said central office switching systems;

a call processing method comprising the steps of:

storing in database storage in said communications network for each of a plurality of said residence directory numbers one or more first identification parameters;

storing in database storage in said communications network for each of said first identification parameters a billing business directory number;

storing in database storage in said communications network for each of said business billing directory numbers at least one of said system administrator directory numbers for a system administrator associated with said business billing directory number; and activating a billing service for a business associated with one of said business billing directory numbers by (a) connecting to one of said database storages via one of said local communication lines associated with a system administrator directory number identified with said business billing directory number in said storage of business billing directory numbers and system administrator directory numbers in said communications network, and (b) identifying via said one of said local communication lines associated with a system administrator directory number a residence directory number and a first identifying parameter which are identified with said business billing directory numbers in said storage of billing business directory numbers and first identifying parameters in said communications network.

9. A communication network comprising:

local communication lines, a first plurality of said lines being connected to residences and having residence directory numbers and a second plurality of said lines being connected to businesses and having business directory numbers including business billing numbers and system administrator directory numbers for system administrators associated with said businesses;

a plurality of interconnected central office switching systems connected to said local communication lines, central offices in said switching systems having program controlled switches and database storage;

a central control separate from the central office switching systems, said central control comprising a database storage storing call processing data associated with said communication lines for control of call processing through one or more of said central office switching systems;

a peripheral platform connected to at least one of the central office switching systems and providing at least one auxiliary call processing capability for said central office switching system, said peripheral platform including a database storage;

one or more of said database storages having stored therein:
(i) one or more first identification parameters for each of a plurality of said residence directory numbers;
(ii) a business billing directory number for each of said first identification parameters for each of said residence directory numbers; and
(iii) a system administrator directory number for a system administrator associated with said business billing directory number for each of said business billing directory numbers identified in (ii);

wherein in response to:
(a) connecting to said peripheral platform via one of said local communication lines associated with a system administrator directory number identified with a business billing directory number in said storage of business billing directory numbers and system administrator directory numbers in said database storage,
(b) identifying via said one of said local communication lines associated with said system administrator directory number a residence directory number and a first identifying parameter which are identified with said business billing directory number in said storage of business billing directory numbers and first identifying parameters in said database storage, and
(c) transmitting a signal over said one of said local communication lines:

the activated-deactivated status of a billing service to the business billing directory number associated with said system administrator directory number identified in (a) is changed.

10. A communication network according to claim 9 wherein said first identifying parameter is a Personal Identification Number (PIN) for a resident of the residence employed by a business associated with the business billing directory number.

11. A communication network according to claim 10 wherein a resident of said residence also has a PIN different than said first named PIN, said different PIN being associated with a different business billing directory number than the business associated with said first named PIN.

12. A communication network according to claim 9 wherein said change in status of said billing service places said service in an actuated status whereby in response to:

dialing from a stored residence directory number a predetermined access code followed by the directory number of a called party;

comparing the residence directory number from which said dialing originated with residence directory numbers stored in database storage in said communications network;

on a match being established in said residence directory numbers, entering from said residence directory number from which said dialing originated a first identification parameter;

comparing said entered first identification parameter with first identification parameters stored in database storage in said communications network;

on a match being established in said first identification parameters identifying a business billing directory number corresponding to the matching first identification numbers and matching residence directory numbers:

the call initiated by said dialing is processed and said call is billed to the business billing directory number corresponding to said matching first identification parameters and matching residence directory numbers.

13. A communication network comprising:

local communication lines, a first plurality of said lines being connected to residences and having residence directory numbers and a second plurality of said lines being connected to businesses and having business directory numbers including business billing numbers and system administrator directory numbers for system administrators associated with said businesses;

a plurality of interconnected central office switching systems connected to said local communication lines, central offices in said switching systems having program controlled switches and database storage;

a central control separate from the central office switching systems, said central control comprising a database storage storing call processing data associated with said communication lines for control of call processing through one or more of said central office switching systems;

one or more of said database storages having stored therein:
(i) one or more first identification parameters for each of a plurality of said residence directory numbers;
(ii) a business billing directory number for each of said first identification parameters for each of said residence directory numbers; and
(iii) a system administrator directory number for a system administrator associated with said business billing directory number for each of said business billing directory numbers identified in (ii);

wherein in response to:
dialing from a stored residence directory number a predetermined access code followed by the directory number of a called party;

comparing the residence directory number from which said dialing originated with residence directory numbers stored in database storage in said communications network;

on a match being established in said residence directory numbers identifying a business billing directory number corresponding to the matching residence directory numbers;

entering from said residence directory number from which said dialing originated a first identification parameter;

comparing said entered first identification parameter with first identification parameters stored in database storage in said communications network;

on a match being established in said first identification parameters:

the call initiated by said dialing is processed and said call is billed to the business billing directory number corresponding to said matching first identification parameters and matching residence directory numbers.

14. A communication network comprising:

local communication lines, a first plurality of said lines being connected to residences and having residence directory numbers and a second plurality of said lines being connected to businesses and having business directory numbers including business billing numbers and system administrator directory numbers for system administrators associated with said businesses;

a plurality of interconnected central office switching systems connected to said local communication lines, central offices in said switching systems having program controlled switches and database storage;

a central control separate from the central office switching systems, said central control comprising a database storage storing call processing data associated with said communication lines for control of call processing through one or more of said central office switching systems;

one or more of said database storages having stored therein:

(i) a pair of first identification parameters for at least one residence directory number;

(ii) a business billing directory number for each of said first identification parameters for said at least one residence directory number; and (iii) a system administrator directory number for a system administrator associated with said business billing directory billing dr each of said business billing directory numbers identified in (ii);

wherein in response to:

dialing from a stored residence directory number a predetermined access code followed by the directory number of a called party;

comparing the residence directory number from which said dialing originated with residence directory numbers stored in database storage in said communications network;

on a match being established in said residence directory numbers entering from said residence directory number from which said dialing originated a first identification parameter;

comparing said entered first identification parameter with first identification parameters stored in database storage in said communications network;

on a match being established in said first identification parameters identifying at least one business billing directory number corresponding to the matching first identification parameters and matching residence directory numbers:

the call initiated by said dialing is processed and said call is billed to the business billing directory number corresponding to said matching first identification parameters.

15. A communication network comprising:

local communication lines, a first plurality of said lines being connected to residences and having residence directory numbers and a second plurality of said lines being connected to businesses and having business directory numbers including business billing numbers and system administrator directory numbers for system administrators associated with said businesses;

a plurality of interconnected central office switching systems connected to said local communication lines, central offices in said switching systems having program controlled switches and database storage;

a central control separate from the central office switching systems, said central control comprising a database storage storing call processing data associated with said communication lines for control of call processing through one or more of said central office switching systems;

a peripheral platform connected to at least one of the central office switching systems and providing at least one auxiliary call processing capability for said central office switching system, said peripheral platform including a database storage;

one or more of said database storages having stored therein:

(i) one or more first identification parameters for each of a plurality of said residence directory numbers;

(ii) a business billing directory number for each of said first identification parameters for each of said residence directory numbers; and (iii) a system administrator directory number for a system administrator associated with said business billing directory number for each of said business billing directory numbers identified in (ii);

wherein in response to:

dialing from a stored residence directory number a predetermined access code followed by the directory number of a called party;

comparing the residence directory number from which said dialing originated with residence directory numbers stored in database storage in said communications network;

on a match being established in said residence directory numbers identifying a business billing directory number corresponding to the matching residence directory numbers;

entering from said residence directory number from which said dialing originated a first identification parameter;

comparing said entered first identification parameter with first identification parameters stored in database storage in said communications network;

on a match being established in said first identification parameters:

the call initiated by said dialing is processed and said call is billed to the business billing directory number corresponding to said matching first identification parameters.

16. A communication network comprising:

local communication lines, a first plurality of said lines being connected to residences and having residence directory numbers and a second plurality of said lines being connected to businesses and having business directory numbers including business billing numbers and system administrator directory numbers for system administrators associated with said businesses;

a plurality of interconnected central office switching systems connected to said local communication lines, central offices in said switching systems having program controlled switches and database storage;

a central control separate from the central office switching systems, said central control comprising a database storage storing call processing data associated with said communication lines for control of call processing through one or more of said central office switching systems;

one or more of said database storages having stored therein:

(i) one or more first identification parameters for each of a plurality of said residence directory numbers;

(ii) a business billing directory number for each of said first identification parameters for each of said residence directory numbers; and (iii) a system administrator directory number for a system administrator associated with said business billing directory number for each of said business billing directory numbers identified in (ii);

wherein in response to:

(a) connecting to said peripheral platform via one of said local communication lines associated with a system administrator directory number identified with a business billing directory number in said storage of business billing directory numbers and system administrator directory numbers in said database storage, (b) identifying via said one of said local communication lines associated with said system administrator directory number a residence directory number and a first identifying parameter which are identified with said business billing directory number in said storage of business billing directory numbers and first identifying parameters in said database storage, and (c) transmitting a signal over said one of said local communication lines:

the activated-deactivated status of a billing service to the business billing directory number associated with said system administrator directory number identified in (a) is changed.

17. A communication network comprising:

local communication lines, a first plurality of said lines being connected to residences and having residence directory numbers and a second plurality of said lines being connected to businesses and having business directory numbers including business billing numbers;

a plurality of interconnected central office switching systems connected to said local communication lines, central offices in said switching systems having program controlled switches and database storage;

a central control separate from the central office switching systems, said central control comprising a database storage storing call processing data associated with said communication lines for control of call processing through one or more of said central office switching systems;

one or more of said database storages having stored therein (i) one or more first identification parameters for each of a plurality of said residence directory numbers; and (ii) a business billing directory number for each of said first identification parameters for each of said residence directory numbers;

wherein in response to:

dialing from a stored residence directory number a predetermined access code followed by the directory number of a called party;

comparing the residence directory number from which said dialing originated with residence directory numbers stored in database storage in said communications network;

on a match being established in said residence directory numbers identifying a business billing directory number corresponding to the matching residence directory numbers;

entering from said residence directory number from which said dialing originated a first identification parameter;

comparing said entered first identification parameter with first identification parameters stored in database storage in said communications network;

on a match being established in said first identification parameters:

the call initiated by said dialing is processed and said call is billed to the business billing directory number corresponding to said matching first identification parameters.

18. A communication network comprising:

local communication lines, a first plurality of said lines being connected to residences and having residence directory numbers and a second plurality of said lines being connected to businesses and having business directory numbers including business billing numbers;

a plurality of interconnected central office switching systems connected to said local communication lines, central offices in said switching systems having program controlled switches and database storage;

a central control separate from the central office switching systems, said central control comprising a database storage storing call processing data associated with said communication lines for control of call processing through one or more of said central office switching systems;

one or more of said database storages having stored therein (i) a pair of first identification parameters for at least one of said residence directory numbers; and (ii) a business billing directory number for each of said first identification parameters for each of said residence directory numbers;

wherein in response to:

dialing from a stored residence directory number a predetermined access code followed by the directory number of a called party;

comparing the residence directory number from which said dialing originated with residence directory numbers stored in database storage in said communications network;

on a match being established in said residence directory numbers entering from said residence directory number from which said dialing originated a first identification parameter;

comparing said entered first identification parameter with first identification parameters stored in database storage in said communications network;

on a match being established in said first identification parameters identifying a business billing directory number corresponding to the matching first identification parameters and matching residence directory numbers;

the call initiated by said dialing is processed and said call is billed to the business billing directory number corresponding to said matching first identification parameters and matching residence directory numbers.

19. A communication network comprising:

local communication lines, a first plurality of said lines being connected to residences and having residence directory numbers and a second plurality of said lines being connected to businesses and having business directory numbers including business billing numbers;

a plurality of interconnected central office switching systems connected to said local communication lines, central offices in said switching systems having program controlled switches and database storage;

a central control separate from the central office switching systems, said central control comprising a database storage storing call processing data associated with said communication lines for control of call processing through one or more of said central office switching systems;

one or more of said database storages having stored therein (i) a plurality of first identification parameters for each of a plurality of said residence directory numbers; and (ii) a business billing directory number for each of said first identification parameters for each of said residence directory numbers;

wherein in response to:

dialing from a stored residence directory number a predetermined access code followed by the directory number of a called party;

comparing the residence directory number from which said dialing originated with residence directory numbers stored in database storage in said communications network;

on a match being established in said residence directory numbers identifying entering from said residence directory number from which said dialing originated a first identification parameter;

comparing said entered first identification parameter with first identification parameters stored in database storage in said communications network;

on a match being established in said first identification parameters identifying a business billing directory number corresponding to the matching first identification parameters;

the call initiated by said dialing is processed and said call is billed to the business billing directory number corresponding to said matching first identification parameters.

* * * * *